G. H. BENZON, Jr.
BELT DRIVING MECHANISM FOR RECIPROCATING PARTS OF MACHINES.
APPLICATION FILED NOV. 28, 1910.
990,421.
Patented Apr. 25, 1911.
3 SHEETS—SHEET 3.
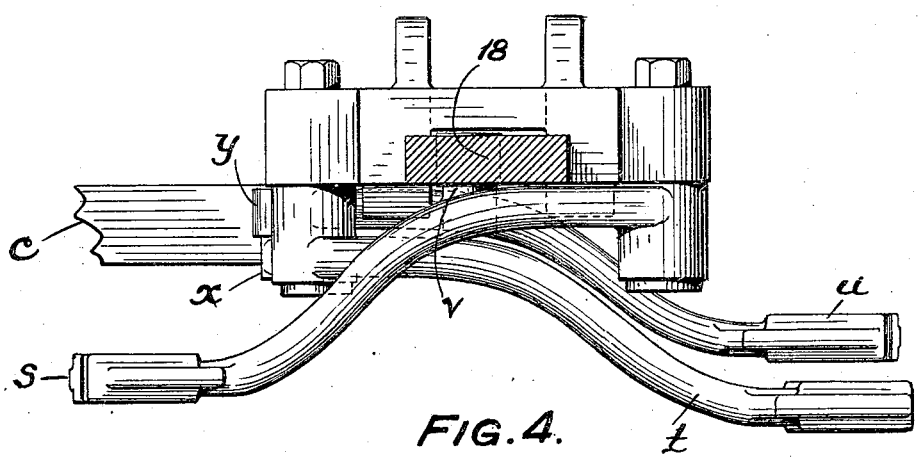
FIG. 4.
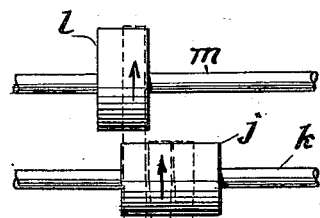
FIG. 5.
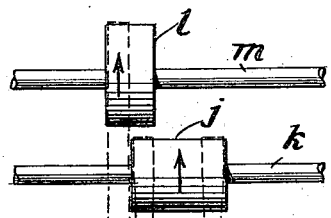
FIG. 6.
WITNESSES:
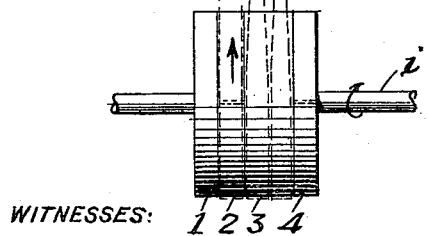
INVENTOR
BY
ATTORNEYS.

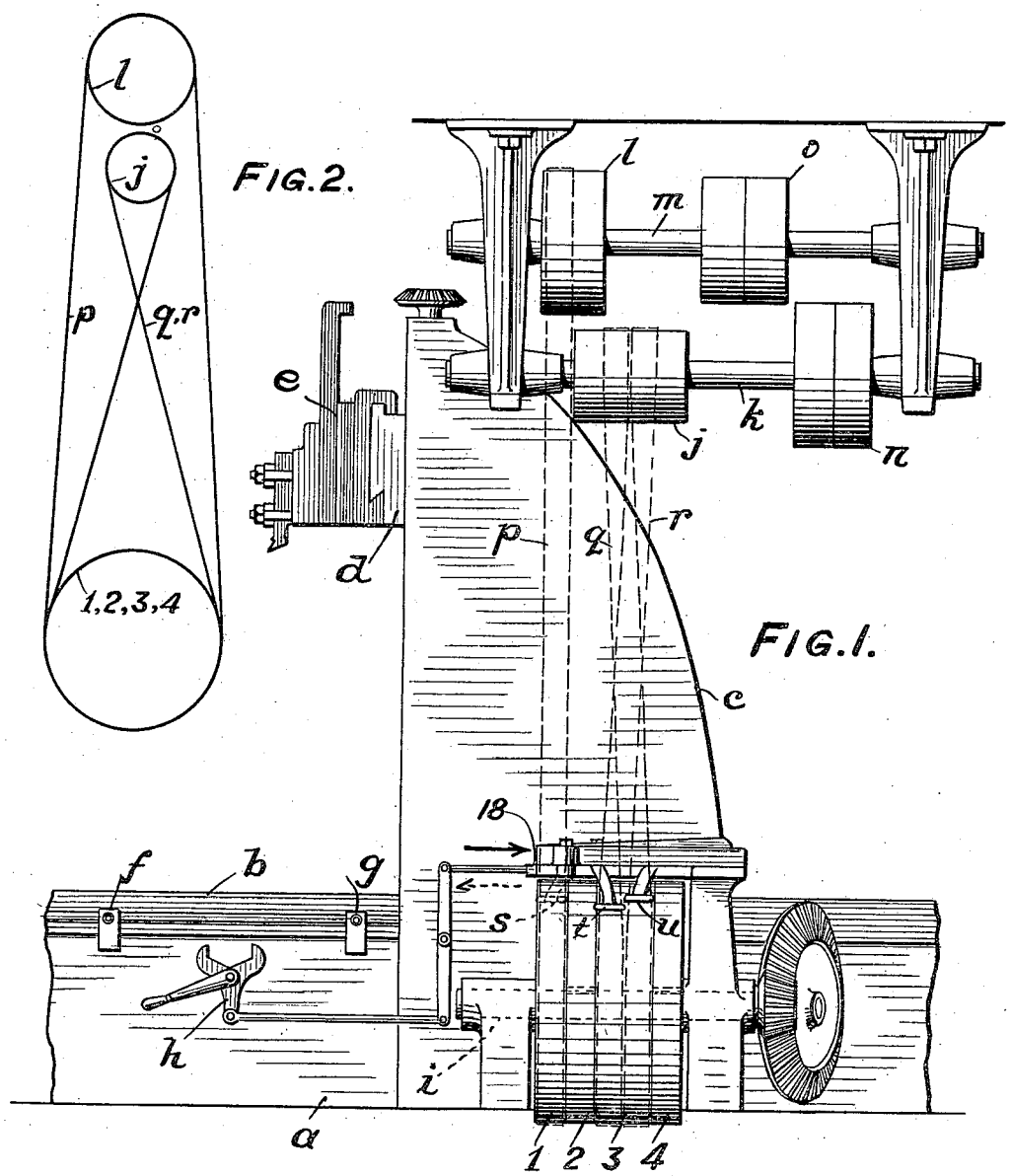

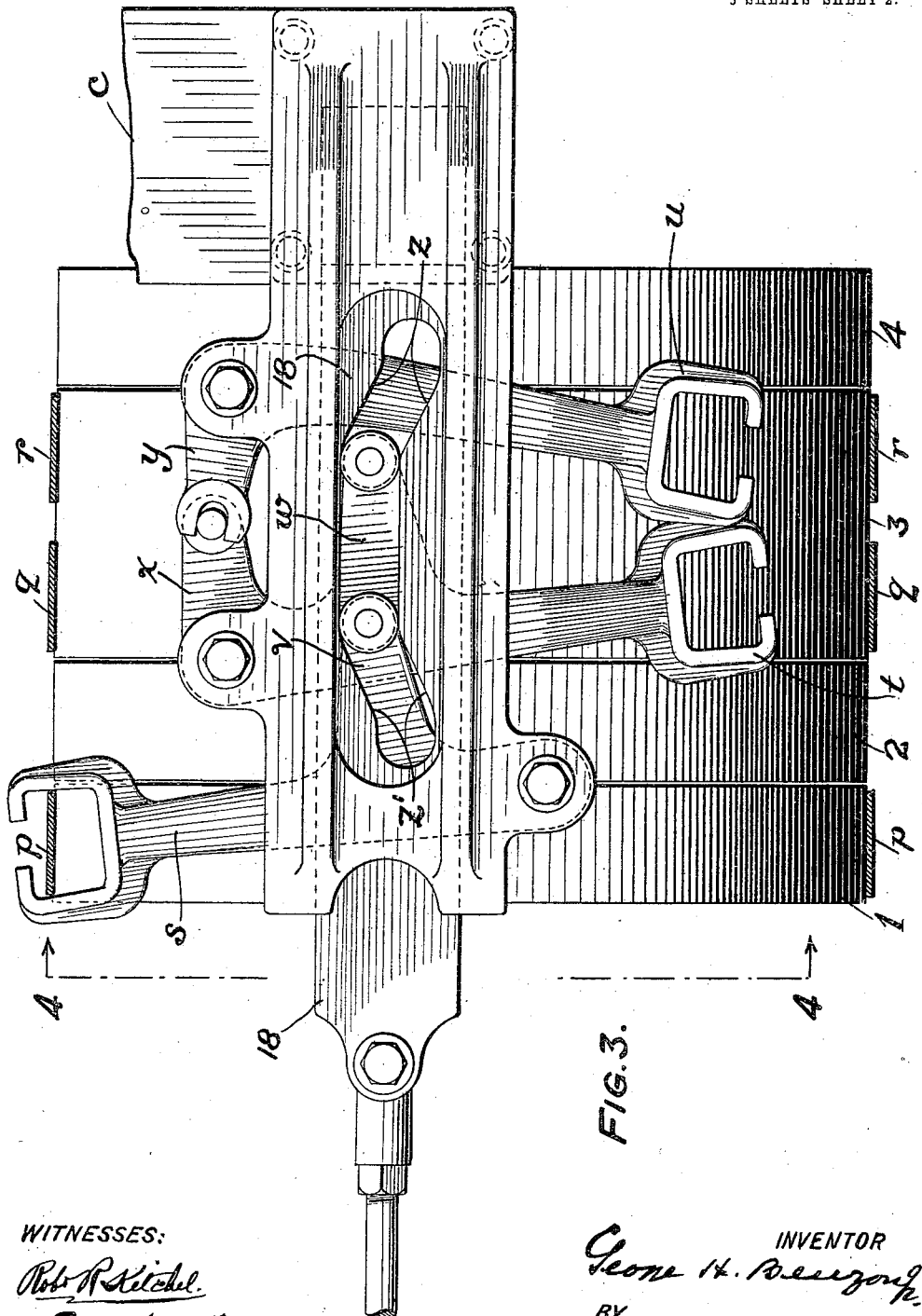

UNITED STATES PATENT OFFICE.

GEORGE H. BENZON, JR., OF JENKINTOWN, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA.

BELT DRIVING MECHANISM FOR RECIPROCATING PARTS OF MACHINES.

990,421.     Specification of Letters Patent.     Patented Apr. 25, 1911.

Application filed November 28, 1910. Serial No. 594,463.

*To all whom it may concern:*

Be it known that I, GEORGE H. BENZON, Jr., a citizen of the United States, residing at Jenkintown, county of Montgomery, and State of Pennsylvania, have invented a new and useful Improvement in Belt Driving Mechanism for Reciprocating Parts of Machines, of which the following is a full, clear, and exact description, reference being had to the accompanying drawings, which form a part of this specification.

My invention is applicable to those machines in which a reciprocating part is operated by belts, running in opposite directions, alternately shifted into and out of action. In such machines the power applied is limited by the practicable speed of the belts and by the width of belt which can be quickly and easily shifted from one pulley to another.

It is not practicable to use shifting belts of very high velocity, owing to the excessive wear in the shifting mechanism, the danger of high speed belts to the operative, and to the further objection that high speed of belt involves high rotative speed on the driven pulleys, and thus increases the difficulty of reversing. In machines of this character the greatest resistance to the reversal of the reciprocating member is usually the inertia of the driving pulley acting as a fly wheel. To insure prompt reversal, therefore, it is most important to keep the fly wheel effect as small as possible. Heretofore, when it has been found necessary to increase the driving power of such machines beyond what was attainable with a single driving belt and a single reversing belt, it has been customary to employ two driving belts and two reversing belts, thus doubling the fly wheel energy to be overcome in the act of reversing.

The object of my invention is to increase the driving power available for the cutting action, without, at the same time, increasing the fly wheel effect proportionately, and also to use the smallest number of pulleys on the driving shaft, so as to reduce the length of the shaft and to make the act of shifting easier to perform. I obtain these results by using a pair of belts for the driving power and only one belt for the reversing motion, and by arranging the pulleys on the driving and countershafts, in such a manner that I am able to use the three belts on two driving pulleys, both of which have narrow faces only wide enough to carry one belt. Speaking generally, I accomplish this by arranging the pulleys on the driving shaft as follows, a loose pulley adapted to one belt, then a driving pulley adapted to one belt, then a loose pulley adapted to two belts, then a driving pulley adapted to one belt. One driving power belt is shifted between the double faced loose pulley and one driving pulley, and the other driving power belt is shifted between the double faced loose pulley and the second driving pulley. As this requires that the first driving pulley shall be alternately operated by two different belts running at different speeds, it is necessary to arrange the countershaft pulleys so as to prevent interference. This I accomplish by using two countershafts at different distances from the pulleys on the machine, making the driving pulley on the more distant countershaft larger than the driving pulley on the nearer countershaft, so that the belt in shifting into the driving position will not come in contact with the overhanging portion of the driving pulley on the nearer countershaft.

The foregoing and mechanism shifting the belts and details of construction form the subject matter of my invention.

I will first describe the embodiment of my invention applied to ordinary metal planing machines, as disclosed in the accompanying drawings, in which—

Figure 1 is an elevational view of a planer embodying my invention. Fig. 2 is a diagrammatic view of the forward and reverse belts. Fig. 3 is an enlarged view of the belt shifting mechanism. Fig. 4 is a cross section on line 4—4, Fig. 3. Figs. 5 and 6 are views showing arrangements of belts for reverse and forward motion.

*a* is the bed of the machine, *b* the table or platen movable back and forth on the bed. *c* one of the side housings, *d* the cross rail carrying the tool head *e*.

*f* and *g* are dogs attached to the table, which act alternately on the shifting lever *h*, as the table reaches one or the other end of its travel, and thereby, through a suitable mechanism, which may be of any of the several kinds usually employed for the purpose, to move the belts alternately on and off of the driving pulleys, and thus move the table backward or forward as required. It is usually desired to make the return motion more rapid than the cutting motion, in order to reduce the total time as much as possible. I will hereinafter describe the specific construction shown in the drawings for shifting the belts.

1, 2, 3 and 4 are the pulleys on the driving shaft $i$, the pulleys 2 and 4 being keyed to the shaft, and therefore driving pulleys, while the pulleys 1 and 3 (the pulley 3 being double faced) are idle pulleys.

$j$ is a pulley for driving during the cutting motion, mounted on the countershaft $k$. 1 is a pulley for driving during the return motion, mounted on a second countershaft $m$. These shafts are driven at appropriate speeds by the ordinary mechanism (not shown) through the pulleys $n$ and $o$.

$p$ is the belt for the return motion. $q$ and $r$ are the belts for driving during the cutting motion. In Fig. 1 the belt $p$ is shown on the pulley 1, and the belts $q$ and $r$ upon the double faced pulley 3, both pulleys 1 and 3 being loose on the shaft $i$, and, therefore, impart no motion to the shaft. In the arrangement shown in Fig. 5, the return motion belt $p$ is on the pulley 2, which being secured to the shaft $i$, will rotate the shaft in the direction of the arrow marked on the belt $p$. In this view, the driving power belts $q$ and $r$ are on the idle pulley 3. Fig. 6 is a view similar to Fig. 5, but with the driving power belts $q$ and $r$ on the pulleys 2 and 4, both of which are secured to the shaft $l$ so that the belts will rotate the shaft in the direction of the arrows, which is the direction to produce the cut. In this condition the belt $p$ is on the loose pulley 1.

It will be noticed that pulleys 1, 2 and 4 are of just sufficient width for one belt, and that the pulley 3 is wide enough for both the driving belts $q$ and $r$ at the same time. As pulleys 3 and 1 are loose on the pulley shaft, they do not reverse their direction with the direction of the shaft, but pulleys 2 and 4, being secured to the shaft, are subject to reversal as the belts are shifted. Pulley 4 is used only when the table is running in the cutting direction, but pulley 2 is used for both cutting and reversing. The return motion belt $p$ is operated by a pulley 1, which is of greater diameter than the pulley $j$, for driving the cutting motion belts $q$ and $r$. The countershaft $m$ for pulley 1 is a greater distance from the driving shaft than is the countershaft $k$. By this arrangement the belt controlled by pulley 1 when shifted, will not come in contact with the overhanging portion of the pulley on countershaft $k$ (see Fig. 2). By driving the countershafts $k$ and $m$ in opposite directions, I can use straight or open belts for both movements, or by driving them in the same direction, I can obtain a reversal of direction by crossing one or more of the belts. This latter arrangement is shown in the drawings, the cutting motion belts being crossed. This crossing of the belts $q$ and $r$ between the countershaft $k$ and the driving pulleys 2 and 4, is for the purpose of obtaining the maximum arc of contact for the driving motion.

The countershafts $k$ and $m$ may be run at the same or different speeds as desired, and it is possible to change the speed of the driving countershaft $k$ by any convenient means without changing the speed of the return countershaft $m$, or the reverse.

In order to shift the three belts in the proper sequence, and at the proper times in the cycle of operation, I make use of three belt shifting levers $s$, $t$ and $u$, each pivoted at one end and provided with a suitable eye or fork to embrace one of the belts. The levers $s$ and $t$ each have a projection respectively denoted $v$ and $w$, engaging with double cam surfaces in a sliding bar 18, and so arranged that the longitudinal movement of the bar 18, back and forth, will cause the levers $s$ and $t$ to oscillate, and thus move the belts on and off of the driving pulleys on the shaft $i$ as required. The parts are so proportioned that the belt or belts for one direction of motion will be moved entirely off of the driving pulley or pulleys before the belt or belts for the other direction of motion will be moved on. Levers $t$ and $u$ have their pivoted ends interlocked by connections $x$ and $y$, which compel them to move simultaneously but in opposite directions, so that as lever $t$ is moved in one direction, lever $u$ is moved in the opposite direction. The levers $t$ and $u$ are set in different horizontal planes, so as not to strike one another when the belt eyes are in their closest position. The forks of levers $t$ and $u$ encircle respectively the belts $q$ and $r$, while the fork of lever $s$ encircles the belt $p$.

The bar 18 is connected to the shifting lever $h$. When this lever $h$ is struck by the dog $f$, the bar is moved in the direction of the full arrow, Fig. 1, and the levers $t$ and $u$ are moved toward each other, bringing the belts $q$ and $r$ upon the idle pulley 3, while the lever $s$ brings the belt $p$ upon the driving pulley 2. When the lever $h$ is struck by the dog $g$, the bar is moved in the direction of the dotted arrow, causing levers $t$ and $u$ to separate, bringing the belts $q$ and $r$ respectively upon the driving pulleys 2 and 4, while the lever $s$ moves the belt $p$ to the idle pulley 1. In the first mentioned movement, the cam groove $z$ first acts to move the levers $t$ and $u$ to shift the belts $q$ and $r$ to the idle pulley 3, and then the groove $z'$ acts to move the lever $s$ to cause the belt $p$ to move to the driving pulley 2. In the second mentioned movement, the groove $z'$ first acts to cause the lever $s$ to shift belt $p$ to the idle pulley 1, and then the groove $z$ acts to shift the belts $q$ and $r$ to the driving pulleys 2 and 4. The straight portion of the groove between $z$ and $z'$ makes certain of the shift to idle pulley of one belt or set of belts before the other belt or set of belts is shifted to the driving pulley or pulleys.

Having now fully described my invention, what I claim and desire to protect by Letters Patent is:

1. In belt driven mechanism of the character described, a shaft, two driving and two loose pulleys thereon, the driving pulleys and one loose pulley being of width adapted to one belt, and the other loose pulley being of width adapted to two belts and two driving and one reverse belt coöperating therewith.

2. In belt driven mechanism of the character described, a shaft, two driving and two loose pulleys thereon, the driving pulleys and one loose pulley being of width adapted to one belt and the other loose pulley being of width adapted to two belts, three belts, means to shift one of said belts between the single width loose pulley and one of the driving pulleys, and to shift the other two belts on to the double width loose pulley, and one of said last mentioned belts to one driving pulley, and the other of said last mentioned belts to the other driving pulley.

3. In belt driving mechanism of the character described, in combination, a shaft, a plurality of pulleys thereon comprising in sequence, a loose pulley adapted to a single belt, a driving pulley adapted to a single belt, a loose pulley adapted to two belts, and a driving pulley adapted to a single belt and two driving and one reverse belt coöperating therewith.

4. In belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose pulley and first mentioned driving pulley, and two belts adapted to the two belt loose pulley and to the contiguous driving pulleys.

5. In belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, and means to shift said belts.

6. In belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously, in opposite directions, for the two belts, and means to operate said levers to shift the single belt between its loose pulley and driving pulley and the two belts between their loose pulley and driving pulleys.

7. In belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously, in opposite directions, for the two belts, a sliding bar having cam surfaces, means to intermittently move said bar in opposite directions, and projections from said shifting levers coöperating with said cam surfaces.

8. In belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously, in opposite directions, for the two belts, a sliding bar, means to move said bar in opposite directions, and a cam connection between said bar and levers.

9. In a belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously, in opposite directions, for the two belts, a sliding bar, means to move said bar in opposite directions, a cam having curved portions forming a connection between said bar and levers.

10. In a belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously, in opposite directions, for the two belts, a sliding bar, means to move said bar, means to move said bar in opposite directions, a cam having curved end portions connected by a straight portion forming a connection between said bar and levers.

11. In a belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously, in opposite directions, for the two belts, a sliding bar, means to move said bar, means to move said bar in opposite directions, a cam having inclined end portions connected by a straight portion forming a connection between said bar and levers.

12. In a belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously in opposite directions, for the two belts, a sliding bar, means to move said bar, means to move said bar in opposite directions, a cam having inclined end portions connected by a horizontal portion forming a connection between said bar and levers.

13. In a belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously, in opposite directions, for the two belts, a sliding bar, means to move said bar in opposite directions, and a slotted cam and projection connection between said bar and levers.

14. In a belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously, in opposite directions, for the two belts, a sliding bar, means to move said bar in opposite directions, and an inclined slotted cam and projection connection between said bar and levers.

15. In a belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously in opposite directions, for the two belts, a sliding bar, means to move said bar in opposite directions, and a slotted cam having inclined portions and projection connection between said bar and levers.

16. In a belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously, in opposite directions, for the two belts, a sliding bar, means to move said bar in opposite directions, and a slotted cam, having end inclined portions connected by a horizontal portion, and projection connection between said bar and levers.

17. In a belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously in opposite directions, for the two belts, a sliding bar, means to move said bar in opposite directions, and a slotted cam having curved portions and projection connection between said bar and levers.

18. In a belt driving mechanism of the character described, in combination, a shaft, a plurality of pulleys thereon comprising in sequence, a loose pulley adapted to a single belt, a driving pulley adapted to a single belt, a loose pulley adapted to two belts, a driving pulley adapted to a single belt, a single belt adapted for the first mentioned loose and driving pulleys, and two belts adapted to the loose pulley adapted to two belts, one of the last mentioned two belts being adapted to one driving pulley and the other of said last mentioned two belts to the other driving pulley, a shifting lever for the single belt, shifting levers pivoted together, so as to move simultaneously, in opposite directions, for the two belts, a sliding bar, means to move said bar in opposite directions, and a slotted cam, having end curved portions connected by a straight portion, and projection connection between said bar and levers.

19. In belt driving mechanism of the character described, the combination with a driving shaft and fast and loose pulleys thereon, of two shafts at different distances from the driving shaft, an operative pulley on each of said shafts, said pulleys having overlapping faces, and a belt passing from each of said pulleys to a driving shaft pulley, the diameter of the pulley on the more remote of the two shafts being greater than the diameter of the pulley on the nearer of the two shafts for the purpose of allowing the belt from the more remote shaft pulley to pass between two of the driving shaft pulleys without interference from the nearer shaft pulley, and means to shift the belts between the fast and loose pulleys on the driving shaft.

20. In a belt driving mechanism of the character described, the combination with a driven shaft, a plurality of pulleys thereon, comprising in sequence, a loose pulley adapted to a single belt, a driving pulley adapted to a single belt, a loose pulley adapted to two belts, a driving pulley adapted to a single belt, of two driving shafts, at different distances from the driven shaft, an operative pulley on each of said driving shafts, said pulleys having overlapping faces and belts passing from said pulleys to the driven shaft pulleys, the diameter of the pulleys on the more remote of the two shafts being greater than the diameter of the pulley on the nearer of the two shafts for the purpose of allowing the belt from the more remote shaft pulley to pass between two of the driving shaft pulleys without interference from the nearer shaft pulley, and means to shift the single belt between its loose pulley and driving pulley and the two belts between their loose pulley and driving pulleys.

21. In a belt driving mechanism of the character described, the combination with a driven shaft, a plurality of pulleys thereon comprising in sequence, a loose pulley adapted to a single belt, a driving pulley adapted to a single belt, a loose pulley adapted to two belts, a driving pulley adapted to a single belt, of two driving shafts parallel with the driven shaft, an operative pulley on each of said shafts, said pulleys having overlapping faces (with respect to the plane of the driven pulley) and belts passing from said pulleys to the driven shaft pulleys, the driving shafts being so arranged with respect to one another and the driving pulleys so proportioned that the belt from either of the said pulleys may pass between a fast and a loose pulley on the driven shaft without interference, and means to shift the single belt between its loose pulley and driving pulley and the two belts between their loose pulley and driving pulleys.

22. In a belt driving mechanism of the character described, the combination with a driven shaft and fast and loose pulleys thereon, of two driving shafts parallel with the driven shaft, an operative pulley on each of said shafts, said pulleys having overlapping faces (with respect to the plane of the driven pulley) and belts passing from said pulleys to the driven shaft pulleys, the driving shafts being so arranged with respect to one another and the driving pulleys so proportioned that the belt from either of the said pulleys may pass between a fast and a loose pulley on the driven shaft without interference.

In testimony of which invention, I have hereunto set my hand, at Philadelphia, on this 26th day of November, 1910.

GEORGE H. BENZON, Jr.

Witnesses:
HELEN FAHNESTOCK,
WARREN R. CHURCH.

---

Copies of this patent may be obtained for five cents each, by addressing the "Commissioner of Patents, Washington, D. C."